United States Patent [19]
Kunihiro et al.

[11] Patent Number: 5,473,255
[45] Date of Patent: Dec. 5, 1995

[54] APPARATUS FOR ESTIMATING NATURAL FREQUENCY OF DISTRIBUTION SYSTEM

[75] Inventors: Naoki Kunihiro, Chofu; Tadashi Naito, Kawasaki, both of Japan

[73] Assignee: Fuji Electric Co., Ltd., Kanagawa, Japan

[21] Appl. No.: 110,227

[22] Filed: Aug. 23, 1993

[30] Foreign Application Priority Data

Aug. 26, 1992 [JP] Japan .................................... 4-226311

[51] Int. Cl.$^6$ .............................. G01R 23/167; H02J 3/01
[52] U.S. Cl. .................. 324/618; 324/76.12; 324/76.21; 324/605
[58] Field of Search .............................. 324/76.12, 76.13, 324/76.19, 76.21, 605, 618, 623, 119, 158 D, 158 MG, 772, 767; 340/645; 364/481, 484, 485, 487, 572, 576

[56] References Cited

FOREIGN PATENT DOCUMENTS 4-67727A 3/1992 Japan .
5-64372A 3/1993 Japan .

OTHER PUBLICATIONS

Matsumura et al., "Study of a method for identifying the source of harmonics . . .", *Technical Research Reference of the Institute of Electric Power Engineers of Japan*, PE-90-90, Jul. 20, 1990.

*Primary Examiner*—Kenneth A. Wieder
*Assistant Examiner*—Diep Do
*Attorney, Agent, or Firm*—Spencer, Frank & Schneider

[57] ABSTRACT

A method for improving accuracy of estimating natural frequency of a distribution system. The estimation is performed in order to identify a rectifier load that generates harmonics due to commutation oscillation. It includes the steps of measuring a charging current flowing into a power factor improving capacitor to obtain first data, removing fundamental frequency from the first data to obtain second data, determining, from the second data, a first time at which the amplitude of commutating oscillation components takes a maximum value, picking up third data in the interval beginning from the first time and ending at a second time later than the first time by T/N, where T is the period of the fundamental frequency, and N is the number of rectifier phases, performing frequency analysis on the third data to form fourth data by expanding the third data into a Fourier series, and determining a local peak frequency, that is, the natural frequency in the fourth data. This prevents frequency components of particular orders from being emphasized, and reduces interference between the commutation oscillations, thereby making it possible to obtain a local peak value, that is, the natural frequency with ease at high accuracy.

9 Claims, 5 Drawing Sheets

APPARATUS FOR ESTIMATING NATURAL FREQUENCY OF DISTRIBUTION SYSTEM

BACKGROUND OF THE INVENTION

1. Field of the Invention

The present invention relates to a method for estimating natural frequency of a distribution system by performing a frequency analysis on an actually measured current in order to identify a rectifier load generating commutation oscillation.

2. Description of Related Art

Recently, increasing number of rectifier loads, such as inverters for motors and power supplies for computers, in which AC voltage is once converted into DC voltage, have been in use. The increase in the number of rectifier loads presents a problem in that harmonics generated by the rectifier loads will induce misoperation of other machines connected to the same distribution system, and generate abnormal sound or heat in a power factor improving capacitor.

Such harmonics are induced by commutation oscillation in a distribution system caused by notching voltage accompanying the commutation of a rectifier load. Thus, the source (a particular rectifier load) of the commutation oscillation must be identified before appropriate steps to restrict the harmonics are taken.

The mechanism by which harmonics are produced is as follows: First, notching voltage, which refers to dips on the order of 1 ms wide in a line-to-line voltage, is produced by the commutation of a rectifier load like a thyristor converter. The notching voltage induces free oscillation in an LC loop formed by the line inductance and a power factor improving capacitor connected to the distribution system. This free oscillation generates harmful harmonics in the distribution system. Such oscillation in the system triggered by the commutation is referred to as commutation oscillation. The commutation oscillation occurs in a quasi-stable manner. For example, when the number of rectifier phases in the three-phase full conversion is six, the commutation oscillation occurs six times during each period, and when it is twelve to reduce pulsation, the commutation oscillation takes place 12 times during each period.

The identification of a rectifier load that generates harmful harmonics is carried out by several methods. One of them is disclosed by Matsumura, Shinohara, and Naito, "Study of a method for identifying the source of harmonics in an overhead high voltage distribution system", Technical Research Reference of the Institute of Electric Power Engineers of Japan, PE-90-90 (1990), Japanese Patent Application Laying-open No. 64372/1993, and Japanese Patent Application Laying-open No. 67727/1992, which are incorporated here by reference. The outline of this method is as follows: First, a charging current flowing into a power factor improving capacitor is measured. Second, a frequency analysis of the measured current is carried out to obtain a local frequency. Third, a numerical analysis of a simulation circuit of the distribution system is performed to obtain the natural frequency of the distribution system. Finally, the local frequency is compared with the natural frequency to identify the rectifier load causing the harmonics.

More specifically, the waveform of the charging current flowing into the power factor improving capacitor is measured by a current transformer mounted on one of the power factor improving capacitors connected to the distribution system. A frequency analysis of the waveform is made in order to obtain resonant frequencies and amplitudes at these frequencies in respective generation modes that actually take place.

Next, a natural mode is obtained whose resonant frequency is substantially the same as that of each one of the generation modes by using a numerical simulation circuit of the distribution system. It is supposed that a rectifier load that generates a harmonic of that resonant frequency, which is induced by the commutation oscillation, will exist near the nodes which have a sharp response (sensitivity) in the natural mode. In other words, the rectifier load is not supposed to exist near the nodes which have a sensitivity less than a predetermined lower limit. Such nodes are successively excluded from the candidates to narrow down the nodes, thereby identifying the rectifier load that generates the commutation oscillation.

FIG. 1 is a schematic diagram of a device measuring a charging current of a power factor improving capacitor, and processing the measured current.

In this figure, distribution lines 1 are, for example, of a three phase, 6.6 kV distribution system. A power factor improving capacitor 2 is connected to the distribution lines 1. A current transformer 3 is mounted on one of the terminal leads of the power factor improving capacitor 2. The current flowing into the power factor improving capacitor 2 is measured with the current transformer 3, and is applied to an isolating amplifier 4.

The output of the isolating amplifier 4, that is, the input signal to an A/D converter 5 is an analog signal directly proportional to the charging current of the power factor improving capacitor 2, and includes harmonics on the order of several kilohertz generated on the normal frequency component by commutation oscillation. The A/D converter 5 samples the input signal at a predetermined interval, and converts it into a digital signal. The digital signal is sequentially stored in a memory of a computer 6.

The current transformer 3 is readily mounted on the power factor improving capacitor 2. This is because the capacitor 2 is installed in substation equipment of a customer which is supplied with power from the distribution system, and hence the power factor improving capacitor 2 can be easily placed in dead state while mounting the current transformer 3 on the terminal lead of the capacitor 2.

FIG. 2 illustrates a waveform of the charging current measured at the power factor improving capacitor 2 connected to the distribution system. To this distribution system, a rectifier load whose number of rectifier phases is twelve is also connected. The waveform was obtained by outputting the digital data stored in the memory of the computer 6.

In FIG. 2, the axis of abscissas represents time, and the axis of ordinates represents current values. The range along the time axis corresponds to one period T of the fundamental component. In this case, since the normal frequency of the distribution system is 50 Hz, the period T is 20 ms. As is clear from this figure, the measured charging current includes many harmonic components.

FIG. 3 is a graph illustrating the result of a frequency analysis of the charging current shown in FIG. 2. This frequency analysis was carried out by expanding the data D1 corresponding to the charging current of FIG. 2 into a Fourier series. In this graph, the axis of abscissas represents frequency, and the axis of ordinates represents the amplitude of harmonic components of respective orders. The amplitude is generally represented in terms of the ratio of the amplitude of the individual harmonic components to that of the fundamental component.

The natural frequency fr of the distribution system can be obtained from the frequency that gives a local peak amplitude in the graph.

If the distribution system and loads are in the three-phase balanced conditions, and the commutation oscillations of rectifiers occur exactly at the interval of T/N (where N is the number of rectifier phases), the orders of the harmonic components obtained by the frequency analysis, in which the charging current is expanded into a Fourier series, are limited to the following:

$$n = kN \pm 1 \quad (1)$$

where n: the order of harmonics k: natural numbers beginning from 1

N: the number of rectifier phases (the number of commutations during each cycle)

In practice, other order harmonics may occur owing to imbalance of the system impedance, or inequality of commutation interval. In general, however, these harmonics have much smaller amplitude than the harmonics satisfying equation (1). Accordingly, when the natural frequency fr is out of the frequency associated with the order n satisfying equation (1), the natural frequency fr will not be detected because it does not constitute a local peak. This presents a problem in that estimation accuracy of the natural frequency is degraded.

SUMMARY OF THE INVENTION

It is therefore an object of the present invention to provide a method for estimating natural frequency of a distribution system with high estimation accuracy.

According to an aspect of the present invention, there is provided a method for estimating natural frequency of a distribution system to which a power factor improving capacitor and one or more rectifier loads are connected, the method comprising the steps of:

measuring a charging current flowing into the power factor improving capacitor;

forming first data corresponding to the charging current;

removing a fundamental component of the charging current from the first data to form second data;

determining an interval, during which third data is picked up from the second data; and performing frequency analysis on the third data to form fourth data to determine a frequency corresponding to a local peak of the fourth data as the natural frequency of the distribution system.

Here, duration of the interval may be set at T/N, where T is the period of the fundamental component, and N is the number of rectifier phases of one of the rectifier loads.

The step of determining an interval may comprise the steps of:

determining a first time at which the amplitude of the second data takes a maximum value; and determining the interval beginning from the first time and ending at a second time which is T/N later than the first time.

The fourth data may be obtained by expanding the third data into a Fourier series.

According to the present invention, the data in the interval (from the starting point of a commutation to that of the next commutation, in which the amplitude of the commutation oscillation takes a maximum value) is picked up, and frequency analysis is performed on that data. This makes it possible to prevent the natural frequency from being masked by the n-th order harmonics which are emphasized by the conventional frequency analysis, where n is the number given by the above mentioned equation (1). Furthermore, the estimation precision of the natural frequency is improved when a portion of the charging current, at which the amplitude takes a maximum value, is subjected to the frequency analysis.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 4:
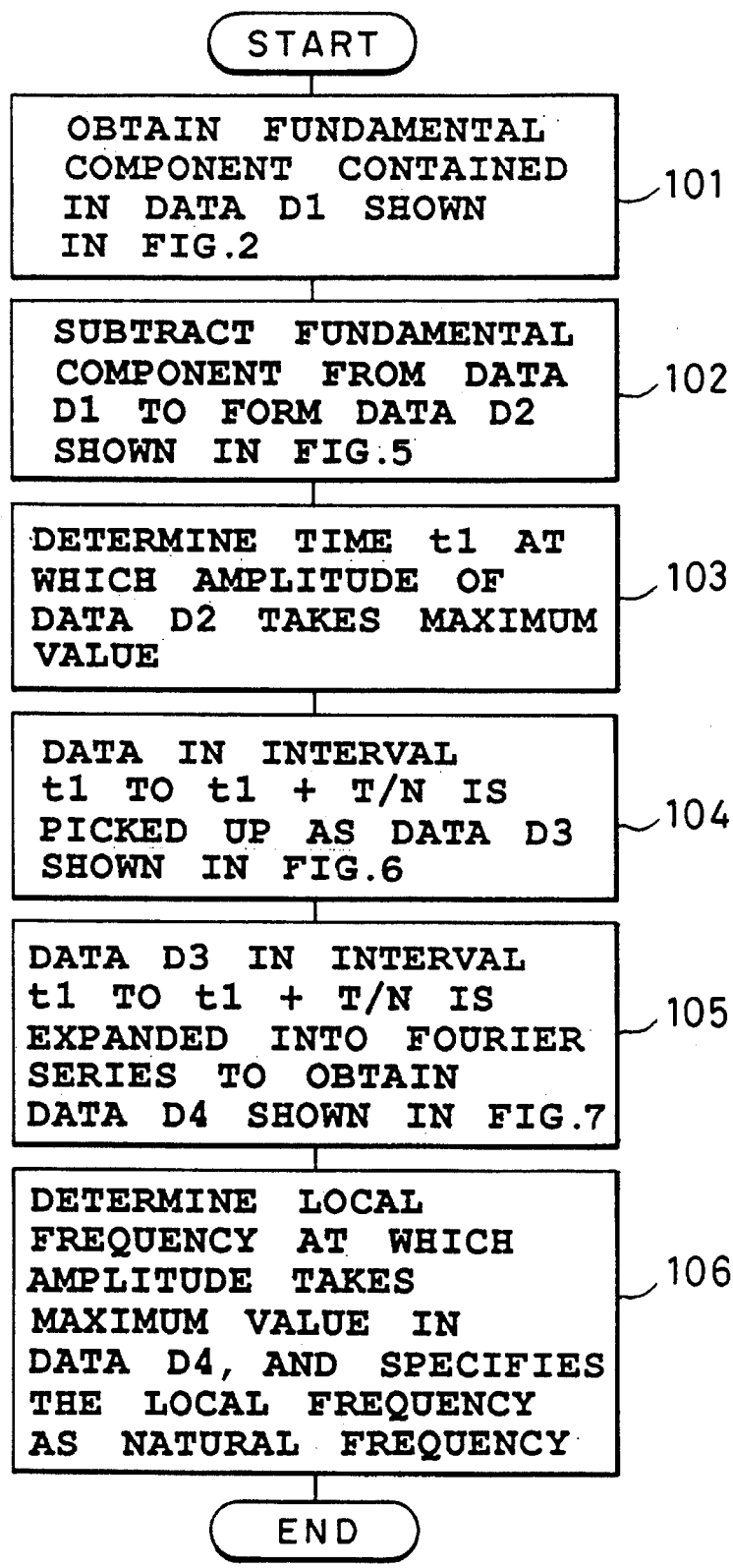
FIG. 4 is a flowchart showing procedures of an embodiment of the natural frequency estimation method in accordance with the present invention.

FIG. 4 is a flowchart showing procedures of an embodiment of the natural frequency estimation method in accordance with the present invention. In this flowchart, data D1 is the data as shown in FIG. 2, and all the steps 101–106 are sequentially executed by the computer 6.

STEP 101

Figure 1:
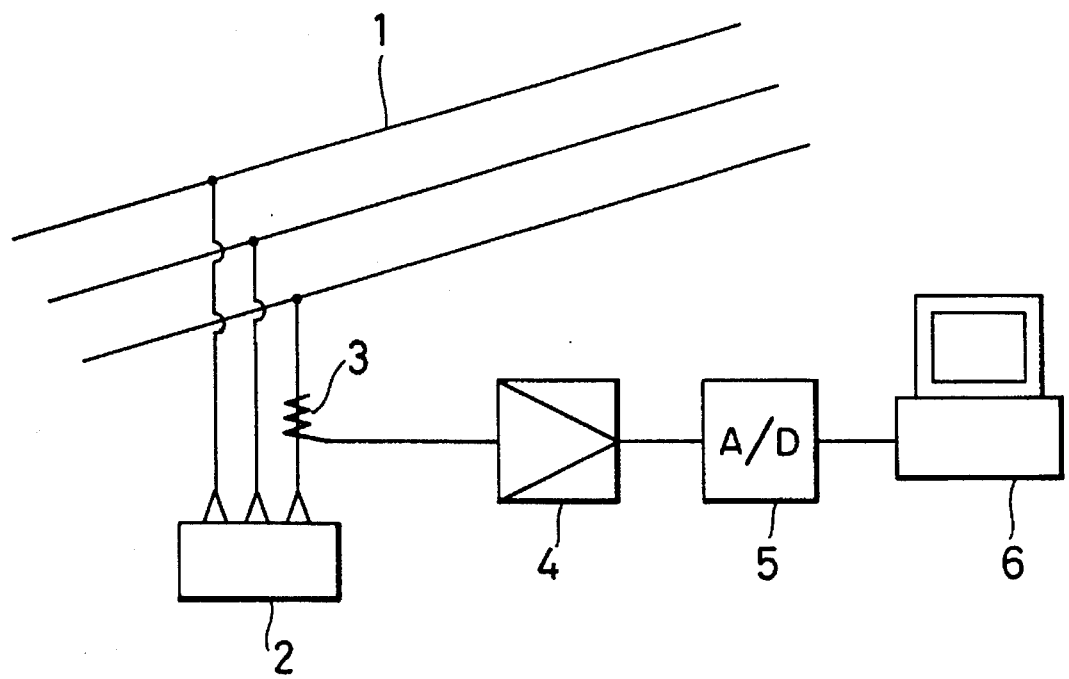
FIG. 1 is a schematic block diagram showing a device that measures the charging current of a power factor improving capacitor 2, and processes the measured charging current.
Figure 2:
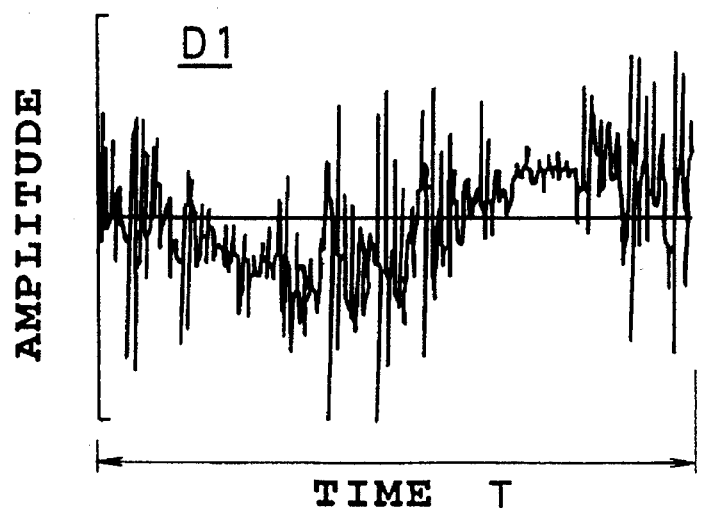
FIG. 2 is a graph illustrating an example of the measured charging current.

The fundamental component of the data D1 as shown in FIG. 2 is obtained.

STEP 102

Figure 5:
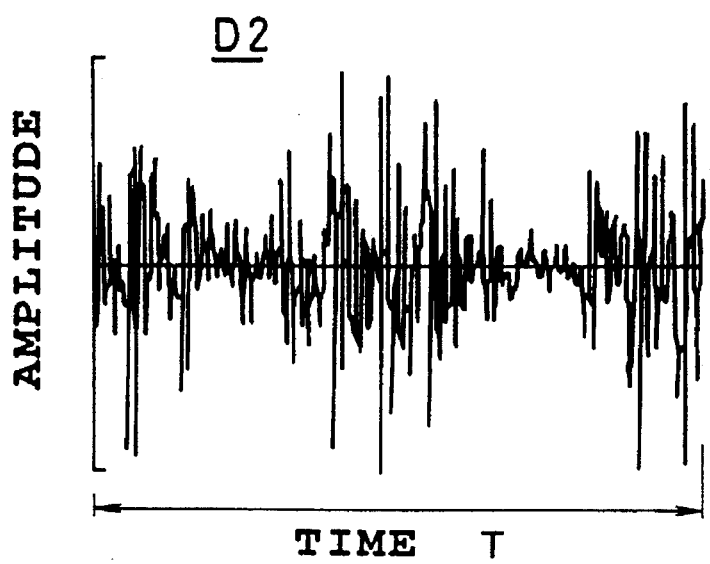
FIG. 5 is a graph illustrating the waveform associated with data D2, which is obtained by removing the fundamental component from the charging current.

The fundamental component obtained at step 101 is removed from the data D1 to obtain data D2 including only harmonic components by a well known technique, for example, performing a Fast Fourier Transform (FFT) on the data D1 to obtain a frequency spectrum, making the amplitude of the fundamental component zero, and then performing an inverse FFT to obtain the data D2. FIG. 5 illustrates the waveform associated with the data D2 which includes only harmonic components as clearly seen by comparing the waveforms of FIGS. 2 and 5.

STEP 103

Time t1 at which the amplitude of the data D2 takes a maximum value is determined. The time t1 is actually determined not in a single period as shown in FIG. 5, but in the entire range of data stored in the memory of the computer 6. The time t1 is one of the start points of commutation oscillation. In this case, the time t1 is not present in the cycle shown in FIG. 5.

STEP 104

The data D3 is obtained from the data D2 by picking up (extracting) the data (D2) present in the interval of T/N beginning from the time t1, where T is the period of the fundamental wave, and N is the number of rectifier phases (N=12 in this case). The time t1 is a starting point of a commutation oscillation as stated before, and the time t1 plus T/N is the time immediately before the starting point of the next commutation oscillation. Therefore, the data D3 represents a single commutation oscillation whose amplitude is the maximum.

Figure 6:
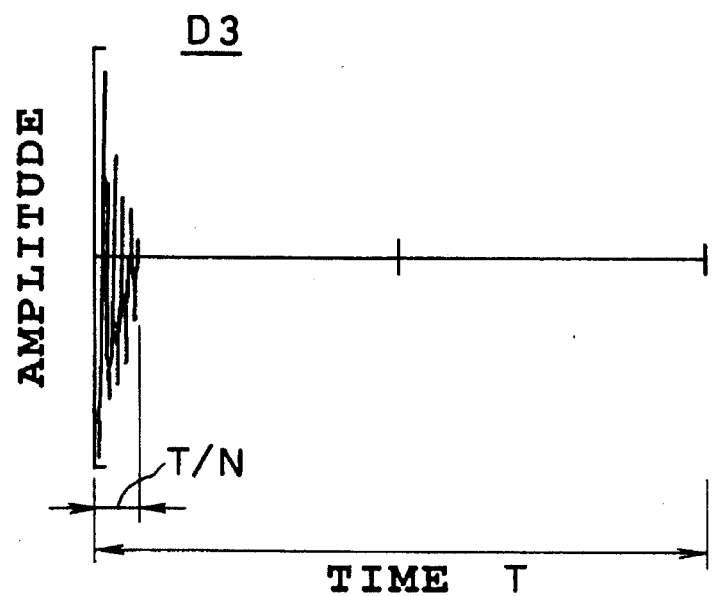
FIG. 6 is a graph illustrating the waveform associated with data D3, which is abstracted from the data D2, and whose duration is 1/N (where N is the number of rectifier phases) of one cycle.

FIG. 6 illustrates the waveform of the data D3. Since this data is picked up from an interval outside the data D2 shown in FIG. 5, the data D3 has no counterpart in FIG. 5.

STEP 105

The data D3 in the interval from t1 to t1+T/N is expanded into a Fourier series to obtain fn and An, where fn is the n-th order frequency, and An is the amplitude of the component of that frequency fn. The frequency fn and amplitude An constitute data D4.

Figure 3:
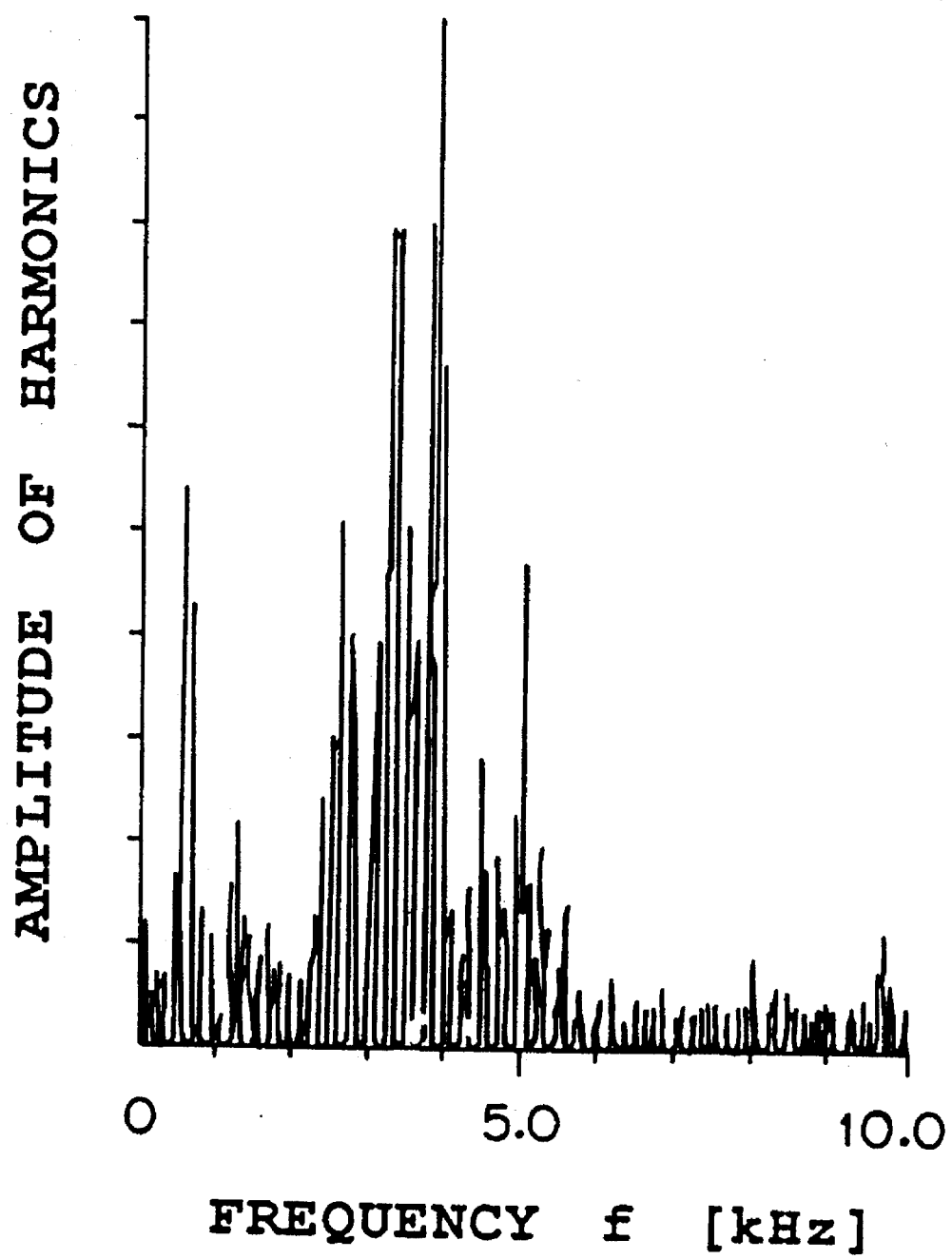
FIG. 3 is a graph illustrating the result of a frequency analysis of the charging current as shown in FIG. 2.
Figure 7:
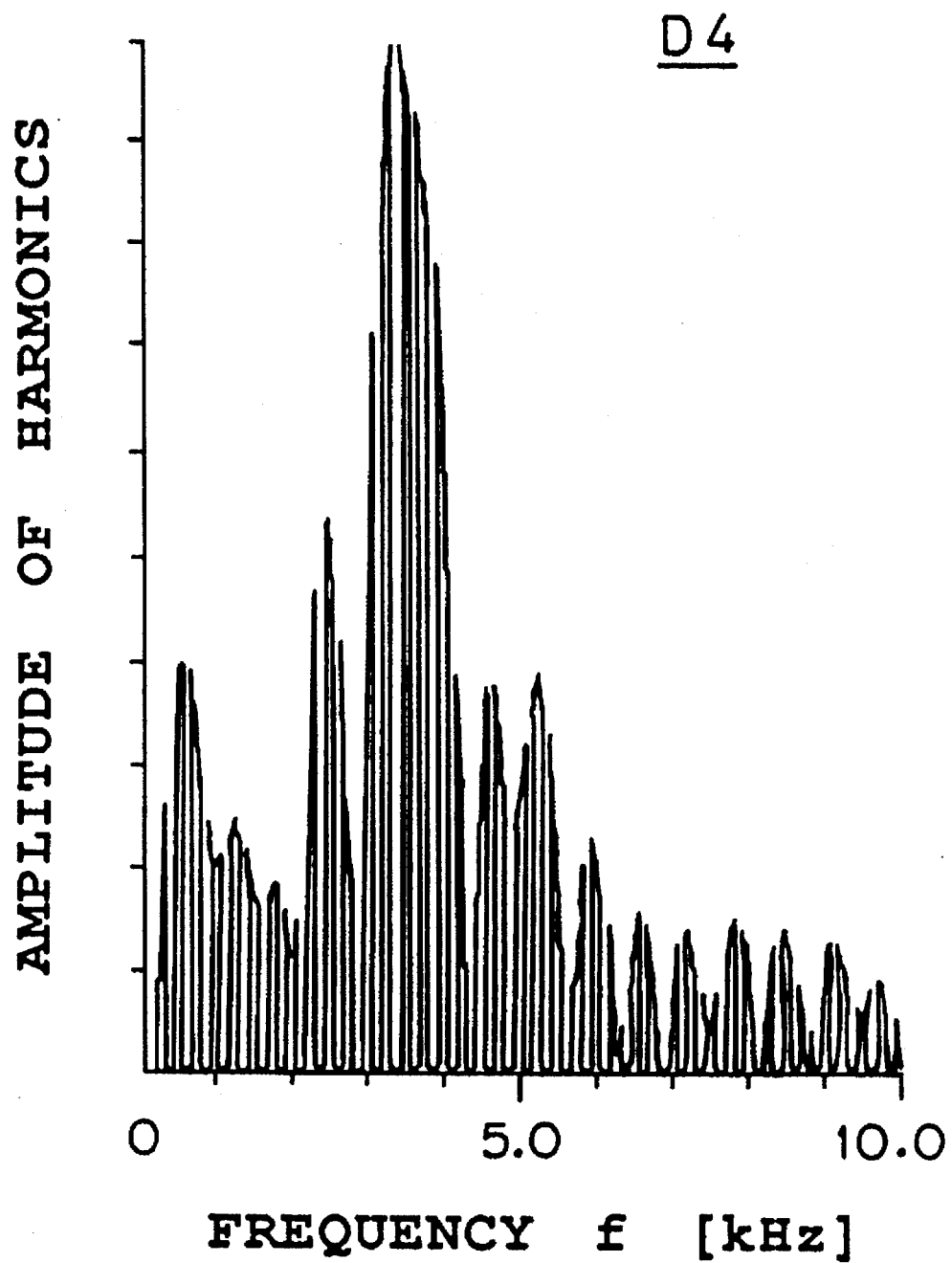
FIG. 7 is a graph illustrating data D4 obtained as a result of the frequency analysis of the data D3.

FIG. 7 is a graph illustrating the data D4. In this figure, the axis of abscissas represents frequency and the axis of ordinates represents the amplitude of harmonic components. The amplitude at the frequencies of the orders n that satisfy equation (1) is not emphasized, because the data D4 are present only in the range from 0 to T/N. The amplitude has a mountain-like profile including a peak amplitude at one frequency, that is, a local peak frequency. The local peak frequency is also an estimated frequency of the natural frequency of the distribution system. By comparing FIGS. 3 and 7, it is clear that the local peak frequency can be identified more easily in FIG. 7 than in FIG. 3.

STEP 106

As described above, the local peak frequency can be easily determined from the graph of FIG. 7 as the frequency corresponding to the peak of the profile. This local peak frequency is the estimation value of the natural frequency of the distribution system.

Thus, the embodiment picks up the data D3 present in the interval ranging from the starting point of a commutation to that of the next commutation, in which the amplitude of the commutation oscillation takes a maximum value, and performs frequency analysis on the data D3. This makes it possible to prevent the natural frequency from being masked by the n-th order harmonics which are emphasized by the conventional frequency analysis, where n is the order of harmonics given by equation (1). Furthermore, the estimation precision of the natural frequency is improved because factors that degrade the precision, such as disturbance of the amplitude and phase of oscillation components associated with the natural frequency, due to the interference between different commutation oscillations, is removed.

Although the embodiment picks up the data having the maximum amplitude to perform the frequency analysis, other data such as having second greatest amplitude may be used. This will not have significant effect on the precision. However, since the algorithm to determined the time t1 corresponding to the maximum amplitude by the computer 6 is very easy, the method using the maximum amplitude is more readily implemented.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for estimating natural frequency of a distribution system to which a power factor improving capacitor and one or more rectifier loads are connected, said apparatus comprising:

measuring means for measuring a charging current flowing into the power factor improving capacitor;

first means for forming first data corresponding to the charging current;

second means for removing a fundamental component of the charging current from the first data by digital filtering to form second data;

third means for determining an interval, and extracting third data from the second data during the interval; and fourth means for performing frequency analysis on the third data to form fourth data and detecting a local peak in the fourth data, wherein a frequency corresponding to the local peak of the fourth data is estimated to be the natural frequency of the distribution system.

2. The apparatus as claimed in claim 1, wherein the duration of the interval is set by the third means at T/N, where T is the period of the fundamental component, and N is the number of rectifier phases of one of the rectifier loads.

3. The apparatus as claimed in claim 2, wherein said third means for determining an interval comprises:

means for determining a first time at which the amplitude of the second data takes a maximum value; and means for determining the interval beginning from the first time and ending at a second time which is T/N later than the first time.

4. The apparatus as claimed in claim 3, wherein the fourth data is obtained by the fourth means by expanding the third data into a Fourier series.

5. The apparatus as claimed in claim 3, wherein the measuring means comprises a current transformer.

6. The apparatus as claimed in claim 1, wherein the first means for forming first data corresponding to the charging current comprises an analog-to-digital converter.

7. The apparatus as claimed in claim 1, wherein the second means for removing a fundamental component of the charging current from the first data to form second data comprises a digital computer configured to perform an FFT operation on the first data to produce a frequency spectrum, reduce the amplitude of the fundamental component in the frequency spectrum to zero, and perform an inverse FFT operation on the frequency spectrum with the fundamental component amplitude reduced to zero, thereby forming the second data.

8. The apparatus as claimed in claim 1, wherein the third means for determining an interval, and extracting third data from the second data during the interval, comprises a digital computer configured to compare absolute values of the amplitudes of the second data to detect a maximum value, determine a point in time associated with the detected maximum value, and extract the third data from the second data, from the determined point in time to the determined point in time plus a calculated time interval.

9. The apparatus according to claim 8, wherein the calculated time interval comprises a period corresponding to the fundamental component, divided by a number of rectifier pulses, and wherein the determined point in time corresponds to a starting point of a commutation oscillation, whereby the third data represents a single commutation oscillation whose amplitude is the maximum.

* * * * *